June 14, 1960
D. W. BEEM ET AL
2,940,701
PERSONNEL ESCAPE EQUIPMENT
Filed June 16, 1958
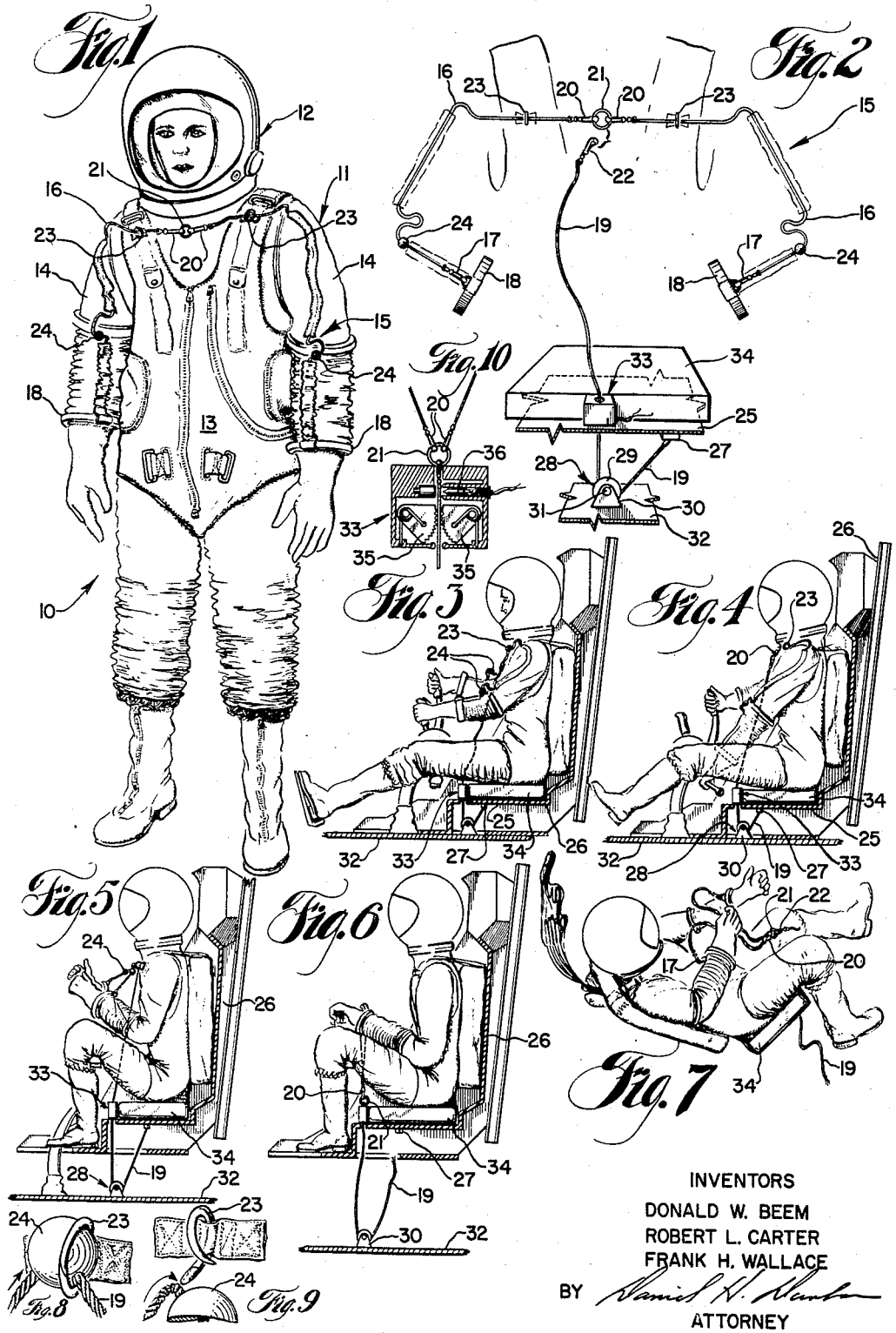
INVENTORS
DONALD W. BEEM
ROBERT L. CARTER
FRANK H. WALLACE
BY
ATTORNEY

United States Patent Office 2,940,701
Patented June 14, 1960

2,940,701

PERSONNEL ESCAPE EQUIPMENT

Donald W. Beem, Gahanna, and Robert L. Carter and Frank H. Wallace, Columbus, Ohio, assignors to North American Aviation, Inc.

Filed June 16, 1958, Ser. No. 742,397

12 Claims. (Cl. 244—122)

This invention pertains generally to personnel escape equipment, and more particularly relates to improved escape apparatus which may be utilized in connection with the ejection of operating personnel from high-performance aircraft and the like in an emergency escape sequence.

With the advent of high-performance aircraft it has become necessary to provide adequate means for use in properly positioning operating personnel for ejection from such aircraft in emergency escape situations. Further, it has become necessary to restrain the ejected person in a proper escape position until such time as he is placed in a motion and environment situation which is not injurious to his person. The problem of providing suitable means for accomplishing these purposes has been particularly complex in view of the time limitations typically established with respect to emergency ejection, in view of the high magnitude of certain forces encountered in an escape from high-performance aircraft, and in view of the generally required degree of operational reliability. Such problems are particularly pronounced with respect to the positioning of extended body portions such as arms and legs.

Our invention basically contemplates the use of flexible, cable-like means to position and/or restrain movement of the body extremities of aircraft operating personnel during an emergency escape sequence. Further, this invention is preferably as associated with an ejection seat component or the like, as typically provided in military aircraft for ejecting flight personnel, for effecting operation of certain of the body positioning and restraining components included therein.

Accordingly, it is an object of this invention to provide suitable equipment for use in properly positioning operating personnel in an emergency escape sequence from high-performance aircraft.

Another object of this invention is to provide means for properly positioning and restraining body extremity portions of aircraft operating personnel in an emergency ejection sequence, in order that severe body injury which would otherwise be caused by contact with aircraft structural and operating components or be caused by flailing of body extremities might be minimized.

Another object of this invention is to provide personnel escape equipment which may be readily incorporated in pressure suits, integral harness, or like apparatus typically utilized by operating personnel of high-performance aircraft.

A still further object of this invention is to provide escape apparatus for use in positioning and restraining body portions of aircraft operating personnel only throughout specified phases of an emergency ejection sequence.

Another object of this invention is to provide personnel escape equipment which may be at least initially powered by ejection components typically utilized to effect an emergency escape from high-performance type aircraft.

Another object of this invention is to provide position restraining equipment with emergency release means which may be operated manually during an escape situation, if required.

A still further object of this invention is to provide escape apparatus which may be used for positioning body portions of aircraft operating personnel but yet which does not interfere with normal operating maneuvers undertaken by such operating personnel.

Another object of this invention is to provide personnel escape equipment, for use in connection with ejection escape sequences from high-performance aircraft, which is extremely light-weight, which is comparatively simple and positive in operation, which may be readily maintained, and which has a very high degree of operational reliability.

Other objects and advantages of our invention will become apparent during detailed consideration of the specification and drawing portions of this application.

In the drawings, wherein like numerals are used to designate like components throughout the same:

Fig. 1 illustrates features of this invention as related to an aircraft pilot's pressure suit;

Fig. 2 schematically illustrates components which may be utilized in the practice of this invention and with the pressure suit of Fig. 1;

Figs. 3 through 7 illustrate use of a preferred arrangement of the features employed in this invention in an emergency escape sequence;

Figs. 8 and 9 illustrate guide means which may be utilized in connection with the practice of this invention; and Fig. 10 sectionally and schematically illustrates retention-cutter means which may be utilized in the practice of our invention.

Fig. 1 illustrates a pressure suit 10 having a body portion 11 and an attached helmet portion 12. Body portion 11 may typically include an integrated harness portion 13 and arm portions 14. Suit 10 is provided with arm positioning means which incorporates features of this invention and which is referenced generally by the numeral 15. The suit portion of positioning means 15 is illustrated in Fig. 1, whereas additional components utilized with such suit portion are illustrated in Fig. 2.

Positioning means 15 is schematically illustrated in its Fig. 2 form as including arm cables 16 which are attached by manually detachable fastener means 17 to the arm bands 18, a withdrawal cable 19 which is attached to the arm cables 16 through the fastener means 20 provided on each cable 16, ring-like stop means 21 which associates fastener means 20 with each other, and fastener means 22 which connects cable 19 to stop means 21. Additionally, it is preferred that each cable 16 be made to associate with a guide means such as 23, and it is also preferred that each cable means 16 be provided with a break-out member 24 for cooperation with the guide means 23.

With respect to the Fig. 2 illustration, it is preferred that the arm band portions 18 be located and sized so as to cooperate with the mid-forearm portion of the person utilizing apparatus 15. Further, it is preferred that cable means 16 be flexible, and that they be attached to the pressure suit arm portions 14 or the like in a rip-out relation. Fastener means 17 may be of a detachable spring-hook or snap-hook type, and preferably should be manually operable. The fastener means 20 and 22 may be of the same type as fastener means 17 in order that they might be manually detached for convenience.

The invention described also includes an arrangement for moving arm cables 16 by means of withdrawal cable 19. In a preferred form, an end portion of cable 19 is provided with shear means 27 for detachably connecting the withdrawal cable to the pan portion 25 of ejection seat 26 (Fig. 3). Means 27 is sheared to release withdrawal cable 19 from seat 26 when the stop means 21 is brought into engagement with mechanism 33 by the seat during an emergency ejection. (See Fig. 6.) Also, as illustrated schematically in Fig. 2, cable 19 preferably cooperates with means 28 for restraining free-movement of cable 19. Means 28 is illustrated as being comprised of a pulley 29, bracket means 30 attached to airplane structure 32, and pin means 31 for attaching pulley 29 to bracket 30. In an alternate form, a like end of cable 19 may be anchored to aircraft structure 32, as through a shear device (not shown).

A retention-release means 33 is provided for restraining the cable means, and therefor associated body portions of a pilot, during at least certain initial phases of an emergency escape from a high-performance aircraft. Means 33 restrains withdrawal of cable 19 after positioning, and is preferably located in, or attached to, the support (survival pack component) 34 shown in Fig. 3. Means 33 may typically include the clamping or snubbing means 35, and the ballistic cutter means 36 as detailed in Fig. 10. Support 34 is preferably attached to harness portion 13 or the like and generally contains emergency equipment for land or sea use. Cutter means 36 is activated in a conventional manner by an initiator means (not shown) to fire the ballistic charge contained therein; with respect to a typical aircraft ejection seat, we prefer that the actuation of such initiator means be coordinated with the operation of an included inflatable bladder member which serves as a conventional seat-man separator means. Component 35 is operative at all times to prevent improper withdrawal of cable 19 therefrom prior to pilot-seat separation.

Utilization of our invention may be described with reference to Figs. 3 through 7. The pilot, dressed in pressure suit 10, or a separate integrated harness, is positioned in ejection seat 26 upon the support 34. Means 34 is generally detachably secured to the harness 13 along with parachute components and the like. As noted in Fig. 3, the cables 16 do not interfere with arm movement, yet the cable portion 19 is maintained in a proper position for immediate actuation. In Fig. 4, the pilot is shown in what may be a typical position with respect to initiation of an emergency escape sequence. At that instant, his hand and other body members are typically in contact with operating control components and are often located adjacent structural components.

To guide associated body extremes to a proper position for an emergency escape, means 15 are fully actuated by ejection of seat 26. As the seat commences its movement away from aircraft structure 32, withdrawal cable 19 causes the arm portions of the pilot to be moved, relative to his body, to the intermediate position illustrated in Fig. 5. Cable means 16 are ripped from the arm portions of suit 10 prior to assuming their taut condition. As upward movement of the ejection seat continues, break-out means 24 is brought into engagement with guide means 23 and thereby causes guide means 23 to lose effectiveness.

Thereafter, arm portions 14 are brought toward the position illustrated in Fig. 6 and when the stop means 21 is brought into contact with the retention-release means 33, a sufficient force will be established by the ejection seat to cause cable 19 to become disconnected from seat 26. This situation is best illustrated in Fig. 6. It should be noted that cable 19 has been drawn downwardly through device 33 but remains in cooperation therewith, and that cable 19 is prevented from withdrawal therefrom by the snubbing action of means 35 of component 33.

During initial entry into a high velocity airstream and also during free fall phases of an ejection sequence, the body portions of the pilot are restrained in essentially the position of Fig. 6 by the arm bands 18, cables 16, withdrawal cable 19, and the retention device 33. When separation as between seat and pilot is effected, as by the heretofore-mentioned conventional bladder-type separator means, the coordinated cutter initiator means is actuated to operate ballistic cutter 36 to thereby sever cable 19 and free the otherwise restrained body portions from restraint by means 33 and the survival pack 34.

It should be noted that the equipment of this invention is so arranged that in the event ballistic cutter 36 fails to function, the arm bands 18 may be manually released from restraint by cables 16. This is accomplished through the provision of sufficient potential slack in the cables to allow detachment of the fastener means 17 from bands 18 by the pilot. This arrangement is best shown in Fig. 6. Also, functional failure of ballistic device 36 does not prevent pilot-seat separation. Cable 19 is positively disconnected from seat 26 during ejection, and the fixed attachment of the retention-release means 33 to the support pack 34 allows proper restraint of the arm portions during all required phases of the ejection sequence.

Figs. 8 and 9 illustrate the relationship between one form of guide means 23 and the break-out means 24 during a positioning sequence. Guide means 23 is preferably located at a position adjacent the junction of the body and arm portions of the pressure suit 10. Also, guide means 23 may take the form of a nondeformable ring which is to be ripped or detached from harness means 13 when a sufficient force has been established in cable means 16 and 19.

Thus it will be noted that our invention may be utilized to provide for proper positioning of body extremity portions of aircraft operating personnel in an emergency ejection sequence. By use of this invention severe body injuries, which would otherwise be caused by contact with aircraft structural and operating components or which would be otherwise caused by extreme flailing, may be totally and effectively minimized. Also, the apparatus provided herein may be readily incorporated as an accessory to presently utilized forms of operating equipment for escape personnel.

This invention may be utilized throughout specified phases of an emergency ejection sequence, and is provided with manually operable emergency release features. Further, the apparatus described and claimed herein may be used without interfering with normal aircraft operation, is comparatively simple and positive in operation, and is especially well-suited to aircraft applications.

It is to be understood that the forms of the invention herewith shown and described are to be taken as preferred embodiments of the same, but that various changes in the shape, size, and arrangement of its components may be resorted to without departing from the spirit of the invention or the scope of the subjoined claims.

We claim:

1. Equipment for association with an ejection seat to move a portion of a body carried by said seat to a restrained position and to maintain said body portion in said restrained position during an emergency escape from an airplane, comprising: band means carried by said body portion for causing and thereafter restraining movement of said body portion, flexible cable means connected to said band means for moving said band means and for thereafter restraining movement of said band means, and retainer means carried by said body for engagement with said cable means to maintain restraint on said cable means and said band means when said body portion has been moved to said restrained position, said retainer means being moved with said body when said body is separated from said ejection seat.

2. The equipment defined in claim 1, wherein there is provided suit means for association with said body portion, said suit means having at least a portion of said cable means secured thereto in rip-out relation.

3. The equipment defined in claim 1, wherein there is provided suit means for association with said body, said suit means having said retainer means connected therewith.

4. Equipment for association with ejection seat means to move a portion of a body secured thereto to a restrained position relative to said body and to maintain said body portion in said restrained position in an emergency escape from an airplane, comprising: harness means for securing said body in said seat means, band means carried by said body portion for positioning and thereafter restraining free-movement of said body portion relative to said body, flexible cable means connected to said band means and disengageably associated with said airplane to cause positioning of said band means when said seat means moves said body from within said airplane, and retainer means carried by said body and engaged with said cable means to restrain movement of said cable means when said body portion has been moved to said restrained position, said cable means being disengaged from said airplane by said seat means when said body portion has been moved to said restrained position, and being thereafter associated with said seat means in a secured relation only through said harness means provided for restricting movement of said body relative to said seat means.

5. The equipment defined in claim 4, wherein said harness means for securing said body in said seat means includes a suit-like component, said suit-like component having that portion of said cable means associated with said body portion contained therein in a rip-out relation.

6. The equipment defined in claim 4, wherein there is provided support means for supporting said body in said seat means, said support means being connected to said harness means and having said retainer means connected therewith.

7. The equipment defined in claim 4, wherein said cable means is provided with stop means for limiting movement of said cable means relative to said body, said stop means initiating forces sourced by said seat means for disengaging said cable means from said airplane.

8. Equipment for association with an ejection seat to move a portion of a body carried thereby to a restrained position relative to said body and to maintain said body portion in said restrained position in an emergency escape from an airplane, comprising: a first portion which includes suit-like means for association with said body to restrict movement of said body relative to said seat, band means for association with said body portion for purposes of movement and thereafter restraining said body portion, and cable means carried by said suit-like means for moving and thereafter restraining said band means, a second portion which includes support means for association with said seat to support said body therein, withdrawal means detachably associated with said airplane for moving and thereafter restraining said body portion, and retainer means associted with said support means for engagement with said withdrawal means to restrain said withdrawal means subsequent to disengagement from said airplane, stop means for detachably connecting said withdrawal means to said cable means, said support means being detachably connected to said suit-like means.

9. The equipment defined in claim 8, wherein said cable means is secured to said suit-like means in rip-out relation, said cable means being separated from said suit-like means when said withdrawal means causes said body portion to be moved to said restrained position.

10. Equipment for moving a portion of a body carried by an ejection seat to an intermediate position and to a restrained position during an emergency escape from an airplane, comprising: harness means for detachably securing said body to said seat, cable-like means for moving said body portion to said positions only during movement of said seat from within said airplane, and guide means carried by said harness means for cooperation with said cable-like means to direct said body portion to said intermediate position prior to movement to said restrained position.

11. The equipment defined in claim 10, wherein said cable-like means is provided with break-out means, said break-out means causing said guide means to become inoperative when said cable-like means moves said body portion from said intermediate position to said restrained position.

12. The equipment defined in claim 10, wherein said harness means includes a suit-like component for association with said body portion, said suit-like component having said cable means secured thereto in rip-out relation.

References Cited in the file of this patent
UNITED STATES PATENTS

| | | |
|---|---|---|
| 2,528,532 | Martin | Nov. 7, 1950 |
| 2,836,382 | Martin | May 27, 1958 |